(12) United States Patent
Michael et al.

(10) Patent No.: US 12,088,721 B2
(45) Date of Patent: *Sep. 10, 2024

(54) DONGLE FOR CIPHERING DATA

(71) Applicant: iStorage Limited, Middlesex (GB)

(72) Inventors: John Michael, London (GB); Quan Xu, Middlesex (GB)

(73) Assignee: iStorage Limited, Middlesex (GB)

( * ) Notice: Subject to any disclaimer, the term of this patent is extended or adjusted under 35 U.S.C. 154(b) by 170 days.

This patent is subject to a terminal disclaimer.

(21) Appl. No.: 17/572,266

(22) Filed: Jan. 10, 2022

(65) Prior Publication Data

US 2022/0131701 A1 Apr. 28, 2022

Related U.S. Application Data

(63) Continuation of application No. 16/429,286, filed on Jun. 3, 2019, now Pat. No. 11,233,653.

(30) Foreign Application Priority Data

Jun. 6, 2018 (GB) .................................. 1809258.5

(51) Int. Cl.
*H04L 29/06* (2006.01)
*G06F 13/42* (2006.01)
(Continued)

(52) U.S. Cl.
CPC ........ *H04L 9/3234* (2013.01); *G06F 13/4282* (2013.01); *H04L 9/3073* (2013.01);
(Continued)

(58) Field of Classification Search
CPC .......... G06F 21/62; G06F 21/60; G06F 12/14; G06F 16/16; G06F 21/31; G06F 21/35;
(Continued)

(56) References Cited

U.S. PATENT DOCUMENTS 6,640,306 B1 10/2003 Tone et al.
7,136,995 B1 * 11/2006 Wann ...................... H04L 9/065
713/153

(Continued)

FOREIGN PATENT DOCUMENTS

EP 1 684 182 A1 7/2006
EP 2 902 934 A1 8/2015
(Continued)

OTHER PUBLICATIONS

International Searching Authority for PCT/GB2019/051542 dated Aug. 16, 2019.
(Continued)

*Primary Examiner* — Mahfuzur Rahman
(74) *Attorney, Agent, or Firm* — NIXON PEABODY LLP (57) ABSTRACT

A dongle for ciphering, receiving and transmitting data to and from an external device is provided. The dongle includes a user interface configured to receive authentication data to confirm an identity of a user. The dongle is disabled for ciphering data unless an authorised user is identified. A data transfer channel is configured to couple the dongle to the external device to receive and transmit user data between the dongle and the external device. A hardware encryption engine is configured to perform a ciphering transformation on user data received from the external device. The dongle is configured to perform a return transmission to return the user data that has been transformed to the external device via the data transfer channel in real-time using a single data transfer channel without storage of the user data on the dongle.

21 Claims, 6 Drawing Sheets

(51) Int. Cl.
*H04L 9/30* (2006.01)
*H04L 9/32* (2006.01)

(52) U.S. Cl.
CPC .......... *H04L 9/3231* (2013.01); *H04L 9/3242* (2013.01); *H04L 9/3247* (2013.01); *H04L 9/3268* (2013.01); *G06F 2213/0042* (2013.01)

(58) Field of Classification Search
CPC .......... G06F 21/32; G06F 21/71; G06F 21/74; G06F 21/78; G06F 3/0487; G06F 3/06; G06F 13/4282; G06F 2213/0042; G06F 2221/2107; G06F 21/72; G06F 21/34; G06F 21/602; G06F 21/6218; H04L 9/32; H04L 9/3234; H04L 9/3073; H04L 9/3231; H04L 9/3242; H04L 9/3247; H04L 9/3268
See application file for complete search history.

(56) References Cited

U.S. PATENT DOCUMENTS

| | | | |
|---|---|---|---|
| 7,272,723 B1* | 9/2007 | Abbott | G06F 21/00 709/223 |
| 8,185,709 B2 | 5/2012 | Kim | |
| 9,286,493 B2 | 3/2016 | Johnson et al. | |
| 9,734,356 B2 | 8/2017 | Johnson et al. | |
| 10,523,646 B2 | 12/2019 | Ackerly | |
| 2002/0069363 A1 | 6/2002 | Winburn | |
| 2003/0233573 A1* | 12/2003 | Phinney | H04L 63/20 726/14 |
| 2004/0123127 A1 | 6/2004 | Teicher et al. | |
| 2005/0259458 A1 | 11/2005 | Rustagi et al. | |
| 2006/0075244 A1 | 4/2006 | Schumann et al. | |
| 2006/0107058 A1 | 5/2006 | Lewis et al. | |
| 2009/0055576 A1 | 2/2009 | Nakanishi et al. | |
| 2009/0327743 A1* | 12/2009 | Finlayson | G06F 21/32 713/186 |
| 2013/0159021 A1* | 6/2013 | Felsher | G06Q 30/0283 705/3 |
| 2013/0182843 A1* | 7/2013 | Buckley | H04L 9/12 380/255 |
| 2014/0068736 A1* | 3/2014 | Agerstam | H04W 12/50 726/7 |
| 2014/0101734 A1* | 4/2014 | Ronda | G06F 21/6227 726/5 |
| 2018/0034804 A1 | 2/2018 | Steiner | |
| 2018/0288005 A1* | 10/2018 | Brathwaite | H04L 9/3239 |

FOREIGN PATENT DOCUMENTS

| | | |
|---|---|---|
| GB | 2566107 A | 3/2019 |
| KR | 1020060070313 A | 6/2006 |
| KR | 100656676 B1 | 12/2006 |
| WO | 98/007255 A1 | 2/1998 |
| WO | 03/027816 A1 | 4/2003 |
| WO | 03/056441 | 7/2003 |
| WO | 2017/123433 A1 | 7/2017 |

OTHER PUBLICATIONS

Great Britain Search Report for Application No. 1809258.5 dated Jun. 6, 2018.

* cited by examiner

DONGLE FOR CIPHERING DATA

CROSS REFERENCE TO RELATED APPLICATIONS

The present application is a continuation of U.S. application Ser. No. 16/429,286 filed Jun. 3, 2019 and entitled "DONGLE FOR CIPHERING DATA," which claims the benefit of UK Application No. 1809258.5 filed Jun. 6, 2018 and entitled "DONGLE FOR CIPHERING DATA."

FIELD OF THE INVENTION

The invention relates to a dongle for ciphering data, the dongle taking the form of a portable hardware device for receiving and transmitting data to and from an external device, and the dongle requiring authentication of the identity of an authorised user before the ciphering operation is permitted. The invention further extends to related methods and computer systems.

BACKGROUND

It is often desirable to store data securely or to transfer data securely between various users. When the data is sensitive it can be encrypted before transferring it over potentially insecure networks or before storing it either on a hardware device or on the "cloud". It is then decrypted during future access to the data. Encryption and/or decryption can collectively be referred to as ciphering.

Ciphering to make data more secure can be done via software or via hardware. The use of hardware encryption engines has advantages in relation to the security of the ciphering transformation and it can allow for fast data transfer with effectively real-time encryption. Hardware encryption is more secure than software based encryption in terms of protection of encryption keys, for example since the keys can be stored internally in the hardware (e.g. in a dongle) and accessed only by internal processors. Hardware based systems can also be made yet more secure via authentication systems incorporated in the device, like a keypad or biometric sensor, making the authentication process safer than the keyboard used by software encryption, which is more vulnerable to attacks such as keyloggers. The applicant company, iStorage Limited, of the United Kingdom, markets a range of products making use of hardware encryption such as the diskAshur™ range of portable encrypted hard drives. These products use a USB 3.0 interface and real-time XTS-AES hardware encryption for data stored on the hard drive. Advantageously, the encryption key is securely stored on the device itself, with protection being provided by a user authentication system such as PIN or biometric. Other products are also available making use of various forms of encryption and differing encryption/ciphering techniques.

One known ciphering technique is "public-key cryptography". In public-key cryptography, each user has a pair of cryptographic keys called the public key and the private key. The public key may be publicly shared with anyone wishing to securely communicate with the key's owner, while the private key is for decrypting data that has been encrypted using that public key. When A wishes to communicate securely with B, A encrypts the message (data) using B's public key and sends the encrypted message to B. B then uses B's private key to decrypt the message. Advantageously, this method does not require the two users, A and B, to secretly exchange an encryption key with one another before communicating over insecure channels.

Another form of encryption is "symmetric-key encryption" in which the same encryption key is used for both encryption and decryption. In such a system, users A and B must first securely exchange the encryption key before they communicate with one another over insecure channels.

Symmetric-key encryption systems have advantages and disadvantages compared to public-key cryptography. Generally, symmetric-key systems are faster for encoding and decoding. In symmetric-key systems encrypted data can be transferred even if there is a possibility that the data will be intercepted. Since there is no key transmitted with the data, the chances of data being decrypted are lower than in public-key systems. Finally, only a recipient who has the key can decrypt the data. Thus senders can be confident that only an authorised recipient can decrypt the data. One compromise arising from the use of symmetric-key encryption is the requirement to provide the initial encryption key to all the users in a secure manner.

Proposals have been made for standalone ciphering devices such as the hardware encryption dongle described in WO2009/136161. This dongle permitted real-time data transfer with simultaneous encryption via a pair of USB interfaces, with one USB connection receiving clear data from a host computing device, and the other USB connection transferring cipher data to an external hard drive or other storage. The diskAshur™ products can be considered as an integration of this type of hardware encryption dongle with a built in hard drive, such that the hardware encryption engine communicates via two data transfer channels, one coupled to a host computer device via a USB 3.0 interface, and the other coupled internally to the hard drive.

Despite the advances provided by the applicant's earlier devices there remains a need for further development of hardware encryption devices such as dongles for ciphering data.

SUMMARY

Viewed from a first aspect, the invention provides a dongle for ciphering data, the dongle taking the form of a portable hardware device for receiving and transmitting data to and from an external device, and the dongle comprising:
  a user interface for interaction with a user to receive authentication data for confirming the identity of a user, wherein the use of the dongle for ciphering data is not enabled unless an authorised user has been identified;
  a data transfer interface for coupling the dongle to the external device for transfer of user data between the dongle and the external device; and
  a hardware encryption engine for performing a ciphering transformation on user data received by the dongle from the external device;
  wherein the dongle is arranged to use the data transfer channel to receive user data from the external device, perform the ciphering transformation on the user data via the hardware encryption engine and, in a continuous operation, return the transformed user data to the external device via the data transfer channel, such that the dongle performs real-time hardware ciphering of user data using a single data transfer channel without storage of the user data on the dongle.

With this dongle the user, after confirmation of their identity as an authorised user, can perform high-speed ciphering operations via the hardware encryption engine with the data being transferred to and from any data storage located on the external device, or accessible to the external device, including data storage in the "cloud". This may use software on the external device or in the cloud, with the software preferably incorporating a dedicated Application Programming Interface (API) that is necessary to access the dongle. This adds further security. As is known, hardware encryption engines can operate with minimal delays, typically in the micro-second range. It has been realised that this permits a single data transfer channel to be used for both incoming and outgoing data, thus allowing one of the two data transfer channels of the prior art (e.g. as in WO2009/136161) to be omitted. The use of only a single data transfer channel makes use of the device more convenient as well as reducing the size and complexity of the dongle.

In addition, as has been demonstrated by existing devices such as the diskAshur™ products sold by iStorage Limited, suitably arranged user authentication systems, which can include authenticated access for encryption keys stored on the device, allow for a product that is both high security and user-friendly. The combination of features of the first aspect therefore result in the combined capability for both high-speed ciphering and high security ciphering. The dongle is also referred to herein as a hardware encryption token. The external device is hardware external to and separate from the dongle, and may for example be a host computing device.

The ciphering transformation may include encryption and/or decryption, for example by using an encryption key stored securely on the dongle. In this context, an encryption key (or "keying material") may be a random string of bits created explicitly for scrambling and unscrambling data (i.e. encrypting and decrypting data). Encryption keys are usually designed using algorithms that are intended to ensure that every key is unpredictable and unique. The encryption key may have a length of 256 bytes (2048 bits) or more.

The transformed user data may hence be an encrypted form of original non-encrypted user data, or a decrypted form of original encrypted user data. The references to ciphering and a ciphering transformation are intended to encompass encryption or decryption, or both encryption and decryption. The ciphering transformation may include a conversion between cipher data and clear data, such as between cipher text and clear text, and vice versa.

The dongle may hold an encryption key that is accessible only to an authorised user as identified by the user interface, in which case the encryption key may be stored in a ciphered form with access and decryption of the encryption key only being permitted once the user interface identifies an authorised user. The encryption key may for example be for use in symmetrical key encryption. Thus, the encryption key held on the dongle may be a secret key as used for symmetrical key encryption and the dongle may perform encryption and/or decryption using a single encryption key stored on the dongle.

As noted above, the dongle of the first aspect uses only a single channel for continuously receiving data from the external device and sending data to the external device. The ciphering transformation by the hardware encryption engine may be practically instantaneous and hence in example embodiments the return transmission of a transformed data packet to the external device may occur without delay after the receipt of the data packet from the external device. This, there is no time delay other than the time required for the hardware encryption engine to perform the ciphering transformation. This can be of the order of μs as noted above. Thus, the ciphering transformation by the hardware encryption engine advantageously occurs directly upon receipt of a data packet from the external device, with the return transmission of a transformed data packet to the external device similarly occurring directly upon completion of the ciphering transformation.

The data transfer channel may operate in sequential steps for transmission of user data from the external device to the dongle, and for return of transformed user data from the dongle to the external device. Alternatively, with a suitably high-speed interface there may be simultaneous transport of user data in both directions. Thus, as a data packet n is transmitted to the dongle a transformed data packet n−1 is returned from the dongle, then as a data packet n+1 is transmitted to the dongle, a transformed data packet n is returned from the dongle. The hardware encryption engine may be arranged to continuously transform the data whilst the data transfer channel is continuously transporting both incoming data and outgoing transformed data to and from the hardware encryption engine.

It will be understood that it is significant advantage of the dongle of the first aspect that only a single data transfer channel is required for the ciphering operation. The dongle may optionally include no further data transfer channels, such that there is only a single data transfer channel, which may be used for during ciphering of data as well as being used for other operations such as for exchange of commands between the dongle and the external device and/or for operations conducted during commissioning of the device, such as enrolment of the user(s) and or transfer of an encryption key to the device.

The data transfer channel is advantageously capable of high speed data transfer rates, and in particular may be capable of data transfer rates equivalent to that available via USB 3.0 "SuperSpeed USB". Thus, the data transfer channel may be capable of data transfer at rates of up to 5 Gbit/s (625 MB/s), or at even higher rates. The data transfer channel may include a data transfer interface such as a USB 3.0 interface, or a successor USB standard such as USB 3.1, etc. The use of a USB interface allows the dongle to be compatible with many computer devices, with the data transfer rates of USB 3.0 and above allowing for advantages in terms of high speed mass data transfer during the ciphering process, resulting in high speed real-time ciphering. Alternatively or additionally, the data transfer channel may comprise one or more of wireless USB, Serial ATA (SATA), High Definition Multimedia Interface (HDMI), Peripheral Component Interconnect Express (PCIe), and radio frequency wireless networks, with the use of suitable interfaces as appropriate.

The dongle of the first aspect does not store the user data during the ciphering process and instead it continuously ciphers data and returns transformed data to the external device. Advantageously there may be no mass data storage device on the dongle, i.e. it is not capable of storage of encrypted or non-encrypted user data transferred to the dongle from the external device. The dongle may hence be a dedicated ciphering device, intended to handle ciphering of user data without having any mass data storage function. It is to be noted that the absence of storage for user data does not mean that the device has no capability for storage of information at all, and naturally there may be some storage enabling the dongle to retain data required for its operation. For example with the use of an encryption key held on the dongle then this may be stored (or encrypted and stored) in a dedicated memory, which may be used only for encryption key storage or may be used for encryption key storage as well as storage of other information necessary for operation of the dongle, such as authentication data required to confirm the identity of authorised users. However, it is preferred to have no capability to store user data, which instead is transformed by the ciphering operation and returned via the data transfer channel without being stored.

The user interface is arranged for interaction with a user to receive authentication data for confirming the identity of the user. This may include the use of a code such as a PIN and/or the use of biometric data such as a fingerprint. Thus, the user interface may include a keypad for receiving a code and/or a biometric sensor such as a fingerprint sensor. Possible elements of the user interface include one or more of a keypad, biometric sensor, thumb wheel, rocker switch, touch pad, selector switch, encoder, potentiometer, photoelectric switch, or membrane switch, or other suitable device enabling the identity of the user to be confirmed via some form of code or biometric input. As noted above, the user interface may interact with the dongle in order to permit access to an encryption key on the dongle. The dongle may be arranged to require authentication of the identity of the user prior to each use of the dongle, and/or at set time intervals during use of the dongle.

Advantageously, multi-factor authentication may be required in order to enable the use of the dongle for ciphering data, with the multifactor authentication including confirmation of the user's identity via the user interface and confirmation of the dongle's identity via dongle authentication data stored on the dongle. For example, the dongle authentication data may include a suitable digital certificate, such as a certificate with a signature that can be used to check the identity of the dongle. In some embodiments, to allow the hardware encryption engine to perform a ciphering transformation on user data, then the dongle needs to firstly confirm the identity of user through the user interface, and then exchange certificates with server and authenticate the identity of the dongle via the certificate signatures.

The dongle may be arranged to provide real-time ciphering of any type of data, including voice call encryption, e-mail encryption and/or encryption in relation to software as a service (SaaS), i.e. software based on a SaaS architecture.

In a second aspect the invention includes a method of ciphering data using the dongle of the first aspect. The dongle may include any of the other features discussed above. The method can include receiving authentication data for confirming the identity of a user via the user interface, checking the authentication data or authentication data derived data against stored data for authorised users (e.g. a verify a PIN or to perform a biometric identification process), and permitting access to the ciphering function of the dongle only when the received authentication data identifies the user as an authorised user. The method may include transmitting user data from the external device to the dongle via the data transfer interface, performing the ciphering transformation at the dongle using the hardware encryption engine, and returning the transformed user data from the dongle to the external device via the data transfer interface.

The method may include use of the device for real-time ciphering of any type of data, such as use for voice call encryption, e-mail encryption or encryption in relation to software as a service.

The use of the dongle may include the use of dedicated software services on the external device to facilitate transfer of data between the dongle and the external device and/or to facilitate transfer of data to the cloud. In some examples, the dedicated software services include an application programming interface that can be integrated into the operating system or host application running in the external device, which may be a host computing device. By use of the software services, the external device may be arranged to check peripherals to locate dongles intended for use with the software services. Once a dongle is recognised then the software services may initiate the transfer of data to and from the dongle, and prompt the ciphering transformation via the hardware encryption engine of the dongle (subject to the dongle having recognised an authorised user).

In a third aspect, the invention provides a computer programme product comprising instructions that, when executed, will configure a dongle as in the first aspect to operate in accordance with a method as in the second aspect.

In an extension to the above concepts the dongle may be one of a set of multiple dongles, with each dongle being provided with the same encryption key. Thus, there may be multiple separate dongles capable of ciphering data using the same ciphering transformation. This can allow for multiple users to decrypt data using the same encryption key or for multiple users to contribute different sets of encrypted data that can then be decrypted using one encryption key for each of the different sets of data. One possible application for this is secure access to encrypted data at multiple different geographic locations, enabling secure transmission of data between users without the need to separately share passwords or transmit encryption keys between users. It can also allow for secure global transfer of data via the cloud, with the data being in encrypted form whilst it is stored on the cloud and being decrypted in real-time via a dongle as described herein for access to the data from any location without any concern about third parties accessing the data whilst it is on the cloud.

The multiple separate dongles may include a master dongle and a slave dongle, wherein the slave dongle has been securely provided with a copy of a master encryption key (master keying material) from the master dongle. The slave dongle may have been provided with the master keying material by a method comprising: connecting the master dongle and the slave dongle to a data transfer system; transferring the slave dongle's public key to the master dongle via the data transfer system; using the slave dongle's public key at the master dongle to encrypt the master keying material and hence produce encrypted master keying material at the master dongle; transferring the encrypted master keying material to the slave dongle via the data transfer system; decrypting the encrypted master keying material with the slave dongle's private key at the slave dongle; and storing the master keying material at the slave dongle; such that a user of any of the dongles can use the master keying material to decrypt data encrypted by the same dongle or the other of the dongles. Thus, the present invention may extend to a method of manufacturing a dongle as in the first aspect, this method including providing the dongle with master keying material as set out above.

The master keying material may be a master encryption key, such as for use in the ciphering transformation by the hardware encryption engine.

With this method, the slave dongle's private key and the unencrypted master keying material are advantageously not transferred across or read by the data transfer system. The method thus allows the secure production of one or more slave dongle(s) that contain the master keying material and hence allows for secure production of a set of dongles that share the same master keying material. The dongles may then provide a secure dongle-based symmetric key system.

The master keying material can be transferred to a plurality of slave dongles using the same method.

The data transfer system may be a personal computer (PC) that, optionally, is connected to multiple slave dongles for rapid production of a set of slave dongles having the same master keying material. Alternatively, the data transfer system may be a dedicated device designed for the secure production of many slave dongles having the master keying material. Such a dedicated device is advantageously not connected to the internet and may be configured to only run the necessary processes for transferring (encrypted) data between master and slave dongles. For example, the data processing routine for performing the method may be hard-coded into a computer chip in the dedicated device. This can provide extra security when transferring the master keying material against attacks via the internet or from malicious dongles plugged into the dedicated device. In another example, the data transfer system may be a cable or a hub with no internal programs or processor. In this case, the master and slave dongles may be configured to carry out the method using a data processing device in one or each of the dongles. Thus, the dongle(s) may include a processor or similar for performing computing operations.

The dongles include a user interface for identifying an authorised user as discussed above. The master dongle may require a higher level of authorisation before the master keying material can be transferred to another dongle. Thus, the slave dongle(s) and the master dongle when used for encrypting and decrypting data may be accessible to a normal authorised user, whereas there may be a higher level user, such as an administrator, who is permitted access to the master dongle to copy the master keying material and/or access to the slave dongle(s) to access the slave dongle public key and to install new master keying material.

The method may comprise scrambling the slave dongle's public key using a predetermined scrambling algorithm prior to transferring the slave dongle's public key, and unscrambling the slave dongle's public key at the master dongle after transferring slave dongle's public key and prior to encrypting the master keying material. In this case the slave dongle(s) may include a suitable scrambling algorithm and the master dongle may include instructions for unscrambling the scrambled slave dongle's public key. This helps to protect against the case where the data transfer system is compromised and the malicious user has emulated a slave dongle but generated his own public key that is sent to the master dongle for the purposes of discovering the master keying material.

With the added use of scrambling of the slave dongle public key, only the legal slave dongles know the scrambling algorithm and this may be hard-coded onto the dongles, e.g. at the factory when first produced. The data transfer system (and any software thereon for the purposes of performing the method) has no knowledge of the scrambling algorithm, and optionally only the master dongle includes the instructions needed to unscramble the slave dongle public key. This provides a further layer of security against malicious emulated slave dongles, because the hacker has no knowledge of the scrambling algorithm as this is not contained in, nor ever transferred over, the data transfer system, and may only ever be present on the master dongle, where it may be protected via a suitable user authentication system as discussed above. In a case where the length of the public key is 256 bytes (2048 bits), to brute-force crack the scrambling algorithm, an attacker must try 256! times to hack the scrambling algorithm.

As noted above, a plurality of slave dongles may be provided, each having a respective public key and a respective private key; and the method may comprise, for each slave dongle in turn: transferring the slave dongle's public key to the master dongle; encrypting the master keying material with the slave dongle's public key at the master dongle; transferring the encrypted master keying material to the slave dongle; and decrypting the encrypted master keying material with the slave dongle's private key at the slave dongle.

This provides the advantage of rapidly producing a plurality of slave dongles that can be distributed to a plurality of users for the purposes of securely sharing information encrypted with the master keying material.

According to another aspect, there is provided a method of sharing data securely between authorised computing devices, wherein a first computing device is connected to a first dongle as described above and a second computing device is connected to a second dongle as described above, the first and second dongles having been programmed with the same master keying material by any of the methods described above, the method of sharing data comprising: encrypting first data using the first dongle with the master keying material stored in the first dongle; transferring the encrypted first data, optionally across a network, to the second computing device; decrypting the encrypted first data using the second dongle; and transferring the unencrypted first data from the second dongle to the second computing device.

According to another aspect, there is provided a system for securely transferring master keying material between a master dongle and a slave dongle, wherein the slave dongle is a dongle as in the first aspect and optional features thereof, the system comprising: a data transfer system; the master dongle containing a master processor, and master keying material; and the slave dongle containing a slave processor, a slave public key and a slave private key; wherein the data transfer system has a plurality of ports for connecting to the master dongle and to the slave dongle; the data transfer system being configured to transfer the slave dongle's public key to the master dongle; the master dongle being configured to encrypt the master keying material with the slave dongle's public key to produce an encrypted master keying material and to return the encrypted master keying material to the data transfer system; the data transfer system being configured to transfer the encrypted master keying material to the slave dongle; the slave dongle being configured to decrypt the encrypted master keying material using the slave dongle's private key and to store the master keying material at the slave dongle such that a user of any of the dongles can use the master keying material to decrypt data encrypted by the same dongle or the other of the dongles.

The slave dongle may be configured to scramble the slave dongle's public key using a predetermined scrambling algorithm prior to transferring the slave dongle's public key, such that the data transfer system transfers a scrambled slave dongle's public key; and the master dongle may contain the scrambling algorithm and be configured to unscramble the scrambled slave dongle's public key prior to encrypting the master keying material.

The system may comprise a plurality of slave dongles, each being a dongle as in the first aspect or optional features thereof, and having a respective public key and a private key. The data transfer system may contain at least three ports, wherein one port is for connecting to the master dongle and the at least two other ports are for connecting to at least two of the plurality of slave dongles.

A system according to this arrangement can quickly prepare a plurality of slave dongles, without the user having to remove each slave dongle after it receives the master keying material and attach a new slave dongle to the data transfer system.

According to another aspect there is provided a system for securely communicating data between users, the system comprising: a first computing device coupled to a first dongle, a second computing device coupled to a second dongle, wherein the dongles are dongles in accordance with the first aspect and each hold a common encryption key, optionally wherein the dongles have been configured using any of the aforementioned methods or systems, wherein, when the first computing device is used to send first data to the second computing device, the first computing device is configured to send the first data to the first dongle, the first dongle is configured to encrypt the first data using the encryption key, and the first device is configured to send the encrypted first data to the second computing device, optionally via a network, and wherein the second computing device is configured to receive the first encrypted data and send the first encrypted data to the second dongle, the second dongle is configured to decrypt the first encrypted data using the encryption key and to send the decrypted first data to the second computer device.

This system allows users to communicate securely with one another using symmetric-key encryption which is faster than public-key encryption. Further, as the disclosure provides a secure method for providing the master keying material to users, a known disadvantage of symmetric-key encryption regarding the initial transfer of the master keying material is overcome.

As described above, a plurality of dongles may be configured by software or hardware to hold the same master keying material (e.g. encryption key). This can allow for multiple users to decrypt data using the same master keying material or for multiple users to contribute different sets of encrypted data that can then be decrypted by other users using the master keying material common to the dongles.

In an arrangement where a plurality of dongles are configured by software to hold the same master keying material, the dongles may be used to encrypt and decrypt e-mail or messaging apps where the two communicating parties are the only ones that have the secret master keying material. Messages as well as email attachments may be encrypted by the sending party (who has one dongle), and only the receiving party with the same encryption key (who has a second dongle having the same master keying material) can decrypt those messages and/or attachments.

Such dongles may alternatively or additionally be used for real-time communications such as voice over IP calls, again where the two communicating parties are the only ones that have dongles containing the same secret master keying material.

Such dongles may alternatively or additionally be used for sharing files of any sort, whether the files are stored in media or the cloud, or on a server, or locally shared folders, or transmitted through network.

Such dongles may alternatively or additionally be used for secure distribution of software that is protected from execution by unauthorised users. Dongles are provided to users who are authorised to use a certain software. The software will check for the correct key or a unique identifier (in a dongle) to enable the software to be executed.

Such dongles may alternatively or additionally be used to prevent piracy of entertainment media protected by DRM (digital rights management). Often entertainment media (such as videos or music) are encrypted and cannot be played without the correct decryption keys. Dongles according to the present disclosure may be provided to users who are authorised to play the media; the master keying material in the dongles may then be used by DRM software to decrypt the entertainment media.

Such dongles may alternatively or additionally be used as a second factor authentication for online services. For instance, a user may present a login name and password to sign into an online service. The dongle is pre-registered with the online service as a second factor. The online service asks for the dongle to be connected to the computer after the login details are submitted.

Such dongles may alternatively or additionally be used for document tracking to record users who access and view a certain document. For example, it may be important for legal or Top Secret intelligence documents to be restricted to specific individuals and record the identities of those individuals who have viewed the document. Each authorised individual may be provided with a unique key in a dongle and a protected document can only be viewed if an individual has a dongle containing the authorised key. That is, in this example, the dongle functions as a factor of authorisation. The identity of the dongle may be recorded with the document, e.g. by marking the document with the unique key.

Such dongles may alternatively or additionally be used to authorise online transactions, for example online payments. A payment service may be configured to require that a pre-registered dongle is presented before a payment is authorised.

In addition to encryption keys for symmetric key cryptography, dongles according to the present disclosure may further contain a public/private key pair for asymmetric key cryptography. This public/private key pair may be distinct from, or the same as, the public/private key pair that is used in the transfer of the master keying material to the dongle(s), as described above.

This may allow the dongle to be used in, for example, the FIDO (Fast IDentity Online) Alliance's Universal 2nd Factor (U2F) specification, which is a specification for a dongle to serve as a second factor authentication to online services. According to the specification, a FIDO U2F dongle contains a public/private key pair. The user registers the dongle's public key with an online service. Later, the user logs into the online service with user credentials, e.g. login name and password. The service then asks for the user's dongle to be plugged into the computer. The dongle creates a signature using the private key and the online service can verify the dongle by the pre-registered public key.

The inclusion of a public/private key pair in a dongle according to the present disclosure may be useful in allowing the dongle to support the following functions (in addition to data encryption/decryption): creating a digital signature for messages/documents to verify the creator and its data integrity; and/or creating a hash-based message authentication code (HMAC) for messages/documents to verify the creator and its data integrity.

Such a dongle can further include a certificate in addition to the symmetric key(s) and the asymmetric (i.e. public/private) key pair. The certificate may be issued by a trusted certificate authority. Applications or services that intend to use dongles for authentication and encryption may also include a certificate issued by the same certificate authority and can verify the validity of the dongles through mutual authentication based on the certificates. The applications or services can therefore confirm the dongle is genuine prior to using it for authentication or encryption, which further enhances the security of the application scenarios described above.

A unique key may be stored on the dongle that allows the dongle to function as a factor of authorisation.

The dongle may contain a public/private key pair for creating a digital signature for messages/documents to verify the creator and its data integrity and/or for creating a hash-based message authentication code for messages/documents to verify the creator and its data integrity. Optionally, the dongle may further contain a certificate for verifying the validity of the dongle.

The dongle containing a public/private key pair may also create a digital signature for an online service to verify with a pre-registered public key to achieve multi-factor authentication.

BRIEF DESCRIPTION OF THE DRAWINGS

In order to describe the manner in which the above-recited disclosure and its advantages and features can be obtained, a more particular description of the principles described above will be rendered by reference to specific examples illustrated in the appended drawings. These drawings depict only example aspects of the disclosure, and are therefore not to be considered as limiting of its scope. These principles are described and explained with additional specificity and detail through the use of the following drawings.

Certain preferred embodiments of the invention will now be described by way of example only and with reference to the accompanying drawings, in which.

DETAILED DESCRIPTION

The present invention is described with reference to the attached figures, where like reference numerals are used throughout the figures to designate similar or equivalent elements. The figures are not drawn to scale, and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Figure 1:
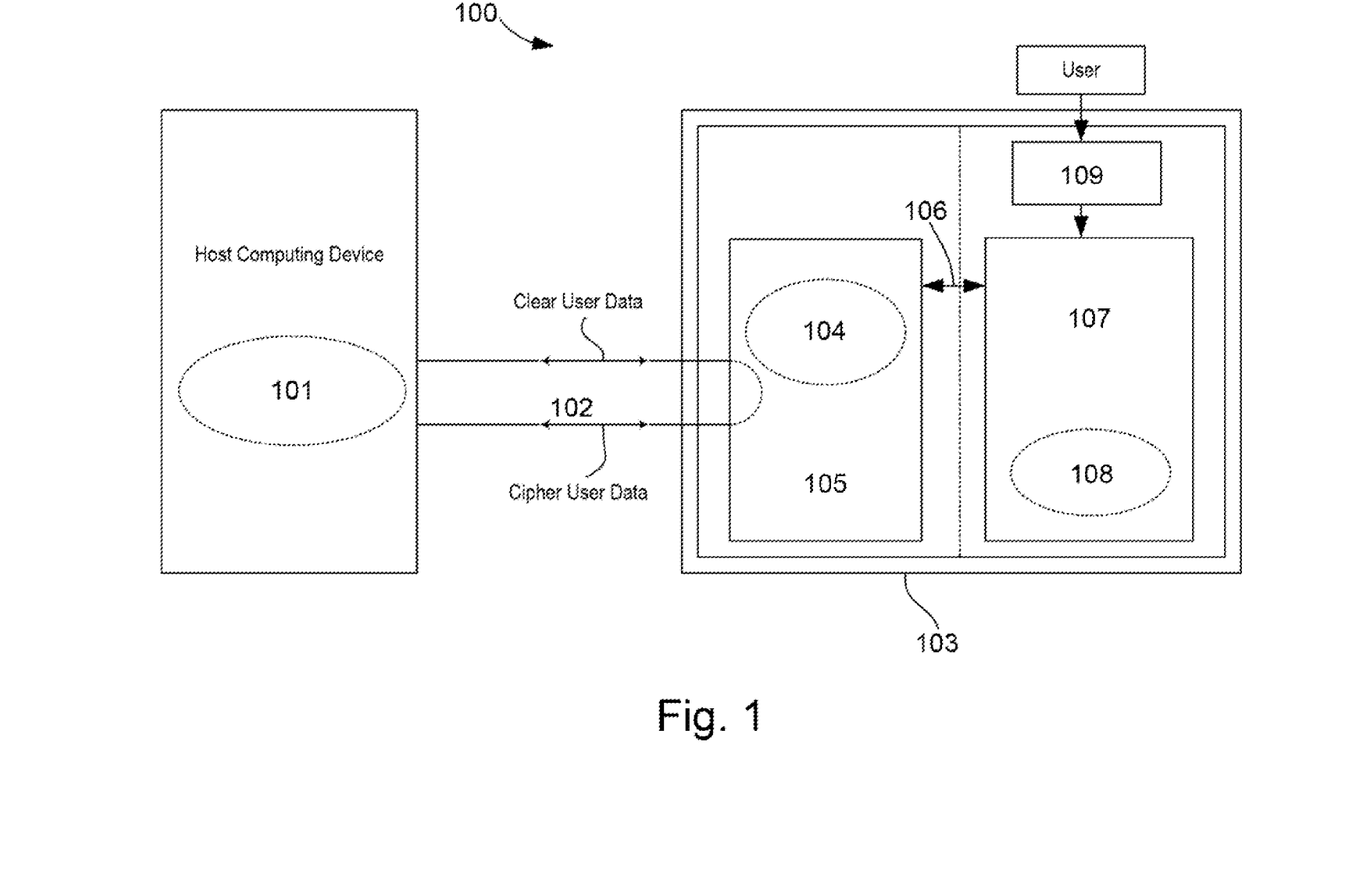
FIG. 1 shows a schematic diagram for a data encryption system.

Referring to FIG. 1, therein is shown a schematic of a data encryption system (DES) 100 using a dongle 103 as a hardware encryption token 103. The DES 100 includes a high speed data transfer channel 102 including a data transfer interface (e.g. USB connector) for transfer of data between the dongle 103 and an external device, such as a host computing device. The dongle 103 is a separate hardware device to the host computing device. It is a portable hardware device that may be disconnected and used with other external devices in differing locations. The DES 100 further includes a DES application programming interface 101.

The DES application programming interface 101 is a group of software services that can be integrated into the operating system or host application running in the host computing device. By initiating the services, the host computing device can check peripherals to search valid DES hardware encryption tokens (dongles) 103, manipulate the host data, and perform the user data encryption/decryption via the token 103.

The data transfer channel 102 provides a means of exchanging data with a host computing device. Universal Serial Bus (USB) is one of the most popular means to connect the DES hardware encryption token 103 to the host. Other examples of the data transfer channel 102 include wireless USB, Serial ATA (SATA), High Definition Multimedia Interface (HDMI), Peripheral Component Interconnect Express (PCIe) and radio frequency wireless networks. Only one data transfer channel 102 is available in the example hardware encryption token 103, and hence the high speed transfer of user data in and out to the token is done through the same data transfer channel 102.

The DES hardware encryption token 103 includes a hardware encryption engine 104, a high speed data bus controller 105, an authentication controller 107, an encryption key 108, and a user interface 109 in the form of a user ID input mechanism 109. To enable the token to be recognised by a host device with the DES application programming interface 101, the user must enter a valid user ID through the user ID input mechanism 109. The user ID input mechanism 109 can include one or more of a keypad, biometric sensor, thumb wheel, rocker switch, touch pad, selector switch, encoder, potentiometer, photoelectric switch, or membrane switch, or other suitable device enabling the identity of the user to be confirmed via some form of code or biometric input.

The authentication controller 107 is operable to control the communication and release of the encryption key 108 to the encryption engine 104 via the internal communication interface 106, based on an input ID entered through the user ID input mechanism 109. Thus, in this example the confirmation of the user as an authorised user both releases the encryption key 108 and also makes the dongle 103 accessible via the DES application programming interface 101. The internal communication interface 106 can be Serial Peripheral Interface bus (SPI), Inter-Integrated Circuit (I2C), General-purpose input/output (GPIO), Universal Serial Bus (USB), ISO/IEC interface. The authentication controller 107 can be a microcontroller or a microprocessor. To provide high security, the authentication controller 107 ideally includes physical security mechanisms that protect it from external violations, side channel attacks, or probing attacks.

The data bus controller 105 is operable to control access by a host device to the DES hardware encryption token 103 so that the token 103 can only be recognised when the authentication controller 107 initiates the communication and releases a valid encryption key.

The hardware encryption engine 104 can be implemented as part of the data bus controller 105. The encryption engine 104 receives data sent by the host computing device via data transfer channel 102 and performs a ciphering transformation. Thus, the encryption engine 104 can receive clear user data and convert it to cipher (encrypted) user data that is sent back to the host device via the same data transfer channel 102. Likewise, the encryption engine 104 can also receive cipher (encrypted) user data sent by host device through the data transfer channel 102 and convert it to clear user data that is sent back to host device via the same channel. The decryption/encryption is an on-the-fly operation done by hardware thus the latency between sending clear user data and receiving cipher user data is negligible, generally in the magnitude of μs. The encryption engine can also be separate controller has the encryption capability to encrypt/decrypt data on the fly along with managing the communication protocol, memory, and other operating conditions.

An encryption key 108 is required by the hardware encryption engine 104 to encrypt/decrypt the information. The encryption key 108 is used in an algorithm (e.g., a 256 bit Advanced Encryption Standard (AES) encryption) that respectively encrypts/decrypts the data from the host device. The encryption key is accessed by the authentication controller 107 when the DES hardware token 103 is online and a valid input ID (e.g. PIN, biometric) is provided by the user. The encryption key can be stored internally or externally but for reasons of security it should not be stored in clear text. The internal or external non-volatile memory that stores the encrypted encryption key shall be protected, controlled access or scrambled.

It has been discovered that, by the employment of hardware based encryption engine 104, a high speed data transfer channel 102, a secure authentication controller 107, and the encryption key 108, the proposed data encryption system can be provide an extremely high speed and massive user data encryption/decryption with both clear and cipher data transferring continuously (and optionally simultaneously) on the same data transfer channel 102.

Figure 2:
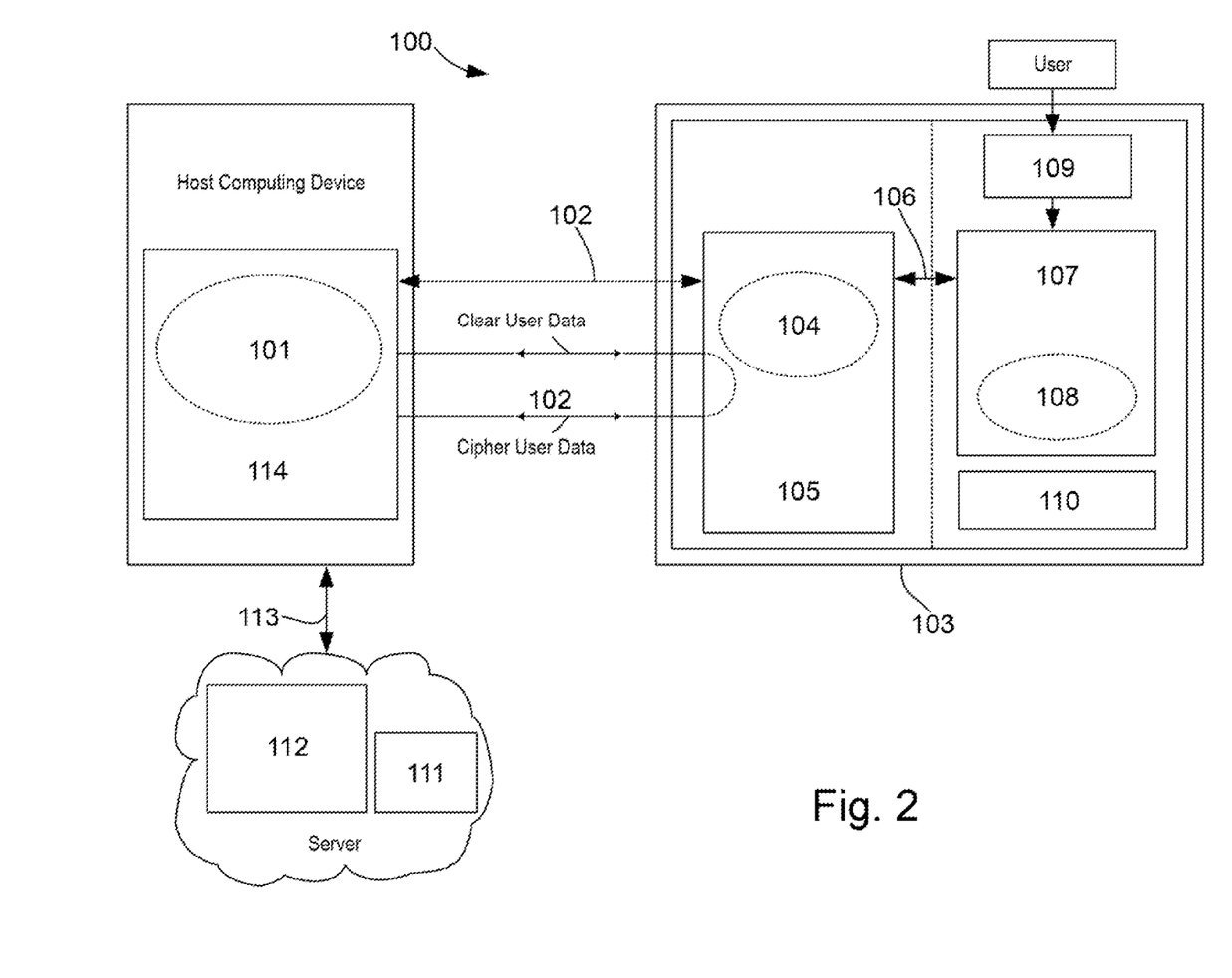
FIG. 2 illustrates the use of the data encryption system during operation.

FIG. 2 expands on the content of FIG. 1 and shows how a host application 114 may operate the DES application programming interface 101, and how a server and the hardware token (dongle) 103 can verify the certificates of one another.

The host computing device is provided with a host application 114. The host application 114 is software that incorporates the DES application programming interface 101 so by running the application 114, the user can locate a valid hardware token 103 (e.g. upon connection of the dongle 103 via the data transfer channel 102) and then perform data encryption/decryption with the hardware token 103. The host application takes files in any format supported by the application, converts the files to binary data, and calls DES application programming interface services to communicate with the hardware token 103. When receiving cipher/plain user data, the host application converts the data to files in the corresponding formats for specific use cases.

The high speed data transfer channel 102 is used in this illustration as a channel to exchange commands between host computing device and the DES hardware encryption token 103, in addition to performing the data transfer during the ciphering process. A network channel 113 is employed to exchange commands/data between a server and the host computing device.

The server includes a server certificate 111 and a server application 112. The server application is operable to handle certificate verification and communicate with a host application 114. In one example a certificate is issued by the root of trust, or issuer, a trusted third-party capable of generating certificates. All such certificates can include the issuer public key and a signature generated by issuer with the issuer private key. A DES certificate 110 can be held on the dongle 103, with the server certificate 111 and DES certificate 110 having different signatures. The server certificate 111 is stored in server non-volatile memory. The DES certificate 110 can be stored in the internal or external non-volatile memory of the authentication controller 107 on the hardware token 103. A process of certificate verification provides an additional layer of security to the data encryption system in that only a verified DES hardware token 103 can be recognised by the host computing device and used for user data encryption/decryption.

An example process of verifying certificates is as follows.
1. The user enters correct user ID through the user ID input mechanism 109, which is authenticated by the authentication controller 107.
2. The DES hardware encryption token 103 is connected to a host computing device
3. Running the host application 114, the hardware token 103 and server begin to exchange the certificates
4. The server and hardware token 103 verify the signatures in the certificates respectively using the issuer public key.
5. If the signatures are verified then the hardware token 103 is recognized by the host application 114.
6. The host application 114 performs massive user data encryption/decryption using the DES hardware encryption token 103.

Figure 3:
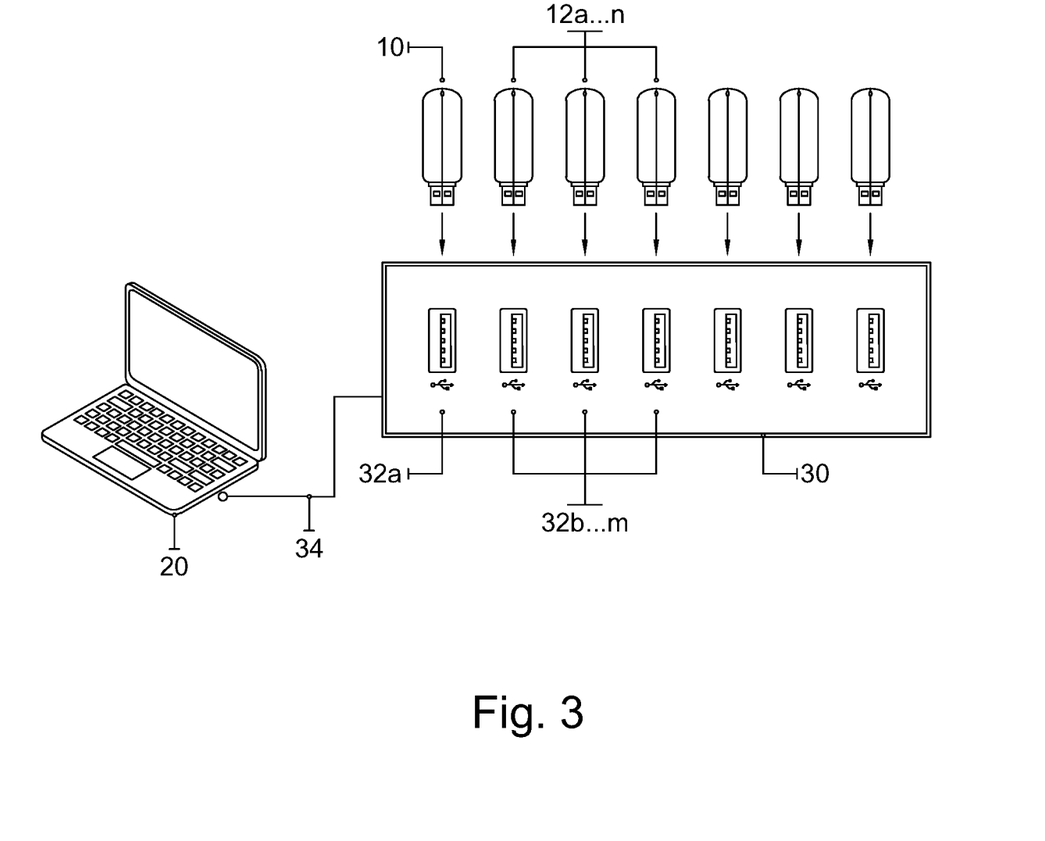
FIG. 3 shows a computer attached to a hub into which are plugged a master dongle and several slave dongles.

The dongle (hardware encryption token) 103 may advantageously be one of several dongles 103 that have the same encryption key, so that multiple users in different locations can encrypt and decrypt commonly accessible data. To securely implement such a system it is necessary to securely transfer the common keying material to multiple dongles. One way to do this is to create a master dongle with master keying material, and to then transfer this master keying material to one or more slave dongles. FIGS. 3 to 6 show an example of a system and method for doing this. FIG. 3 shows a computer 20 and a hub 30 plugged into the computer. A master dongle 10 is plugged into a first port 32*a* on the hub 30. One or more slave dongles 12*a-n*, generally designated 12, are plugged into other ports 32*b-m* on the hub 30. The master dongle 10 and slave dongles 12 are hardware encryption tokens with features as described above in relation to the hardware encryption token 103.

The hub 30 may be any standard USB hub, or a hub with another type of port (e.g. FireWire™). Alternatively, the master 10 and slave 12 dongles may be attached directly to ports in the computer 20, without the use of a hub 30. The dongles use the data transfer channel 102 for communication with the hub 30 or the computer 20.

The above described system, comprising the computer 20 and dongles 10, 12, is for securely transferring master keying material, such as a master encryption key, from the master dongle 10 to the slave dongle(s) 12*a-n*. This allows production of a number of slave dongles that all share the same master keying material. For example, all slave dongles that belong to the same company or working group may use the same master keying material for encryption and decryption when transferring data to one another within the company or working group.

The computer 20 is just one example of a generic data transfer system for connecting the master dongle 10 and the slave dongle(s) 12a-n. However, it is to be understood that other forms of data transfer system may be used.

For example, the data transfer system may be a dedicated device 40 as described below in conjunction with FIG. 5.

Alternatively, the data transfer system may be a cable or a hub with no internal processor, in which case one or both of the master and slave dongles 10, 12 may contain processors configured perform the method steps for securely transferring the master keying material.

When the master dongle 10 is first used, master keying material may be randomly generated by a FIPS approved Random Number Generator and this is stored inside a secure processor in the master dongle 10 in an encrypted form.

Each slave dongle 12a-n has a unique public/private key pair, suitable for use in public key cryptography. As is well understood in public key cryptography, the public key may be publicly shared and seen by others, both friendly and unfriendly. The private key is kept secret and may be used to decrypt data that has been encrypted using the public key.

The computer 20 may run software that is designed for securely transferring the master keying material to each of the slave dongles 12a-n in turn. These slave dongles may then be distributed to e.g. workers in the company or working group for use with their own devices (e.g. PC, laptop, tablet, phone etc.) to allow these devices to securely communicate with one another using the master keying material.

Figure 4:
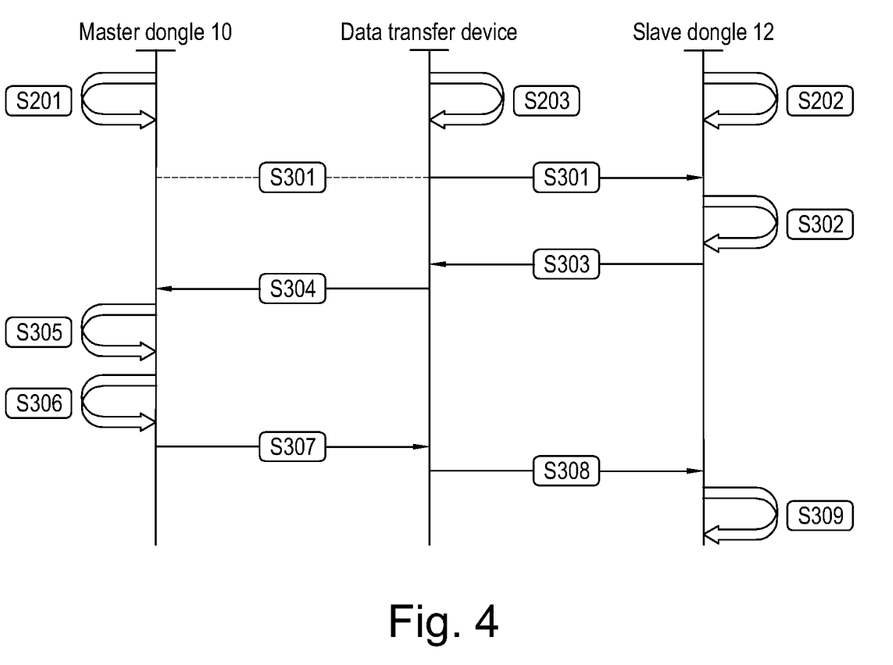
FIG. 4 shows a sequence diagram of method steps for securely transferring master keying material from a master dongle to a slave dongle.

FIG. 4 shows a sequence diagram showing the method by which the master keying material may be securely transferred from the master dongle 10 to each slave dongle 12a-n.

Initial steps 201, 202, and 203 are each optional and independent from one another.

In step 201, a PIN or other authentication is entered into the master dongle 10 to unlock the master dongle 10 such that it may send and receive data.

In step 202, a PIN or other authentication is entered into the slave dongle 12 to unlock the slave dongle 12 such that it may send and receive data. Each slave dongle 12a-n may have a unique PIN or other authentication required to unlock the device. Alternatively, a plurality of slave dongles 12a-n may have the same PIN or temporary single-use PIN, for ease of initial setup.

In step 203, a PIN or other authentication is entered into the data transfer system to allow it to transfer data between and/or communicate with the master and slave dongles 10, 12.

Optional step 301: the data transfer system may request the public key from the slave dongle 12. This request may originate from the master dongle 10 (as indicated by the dashed line in FIG. 4) or from a computer 20 or dedicated device 40 etc.

Optional step 302: the slave dongle may scramble its public key using a predetermined scrambling algorithm (i.e. such that a scrambled public key is presented to the data transfer system in step 103).

Step 303: The slave dongle's public key (optionally scrambled) is transferred to the data transfer system.

Step 304: the slave dongle's public key is transferred to the master dongle 10.

Optional step 305: if the slave dongle's public key was scrambled at step 302, the master dongle, having been pre-programmed with the scrambling algorithm, unscrambles the public key.

Step 306: the master dongle 10 encrypts the master keying material using the (unscrambled) slave dongle's public key.

Step 307: the encrypted master keying material is transferred from the master dongle 10 to the data transfer system.

Step 308: encrypted master keying material is transferred to the slave dongle 12.

Step 309: the slave dongle decrypts and stores the master keying material using the slave dongle's private key.

According to the method shown in FIG. 4, the data transfer system never sees the unencrypted master keying material. Thus, if the data transfer system is compromised by an attacker, the attacker cannot readily discover the master keying material.

The data transfer system may be active in e.g. requesting the slave dongle's public key or may be passive and simply act as a transmission medium for data sent by the dongles 10, 12.

Figure 5:
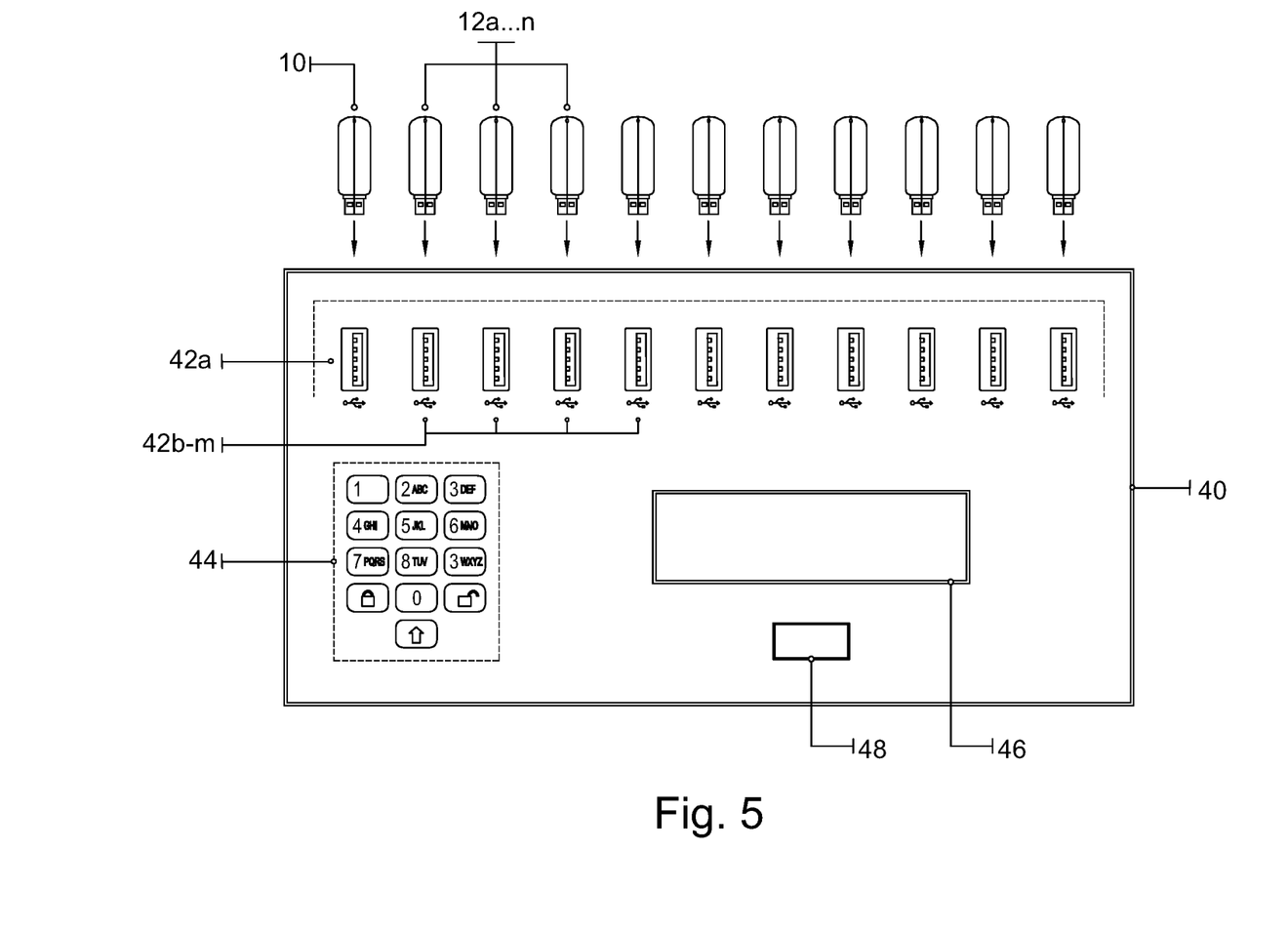
FIG. 5 shows a dedicated device for accepting a master dongle and a plurality of slave dongles.

FIG. 5 shows an alternative system for securely transferring master keying material from the master dongle 10 to the slave dongle(s) 12a-n. In this system, a dedicated device 40 is provided for performing the above method steps 301-309. That is, the dedicated device 40 is the data transfer system in this example.

The dedicated device 40 contains a plurality of ports 42a-m. A first of the ports 42a is for connecting to the master dongle 10. The remaining ports 42b-m are each for connecting to one of the plurality of slave dongles 12a-n.

The dedicated device further comprises a set of control keys 44, a display device 46, and a control button 48.

The control keys 44 may comprise a numeric keyboard with numbers 0 to 9, a lock button, an unlock button, and an arrow button. The dedicated device 40 may optionally require a numeric code to unlock the device (i.e. step 203) before it will perform the method steps 301-309. The lock button may be used to re-lock the dedicated device 40 after use, to prevent unauthorized users making their own slave dongles 12.

The display screen may be a LCD screen for displaying messages to a user, such as "Locked", "Unlocked", "Ready to transfer" etc.

Pressing the copy button 48 may cause the dedicated device 40 to start securely transferring the master keying material from a master dongle 10 plugged into the first port 42a to the slave dongle(s) 12a-n plugged into the other port(s) 42b-m.

When multiple slave dongles 12a-n are plugged into the dedicated device 40, the dedicated device 40 may perform the method steps 301-309 for each slave dongle 12 in turn. That is, steps 301 to 309 are performed for a first slave dongle 12a, and once complete, steps 301-309 are performed for a second slave dongle 12b etc.

Similarly, when multiple slave dongles 12a-n are plugged into the computer 20 (or generally, into the data transfer system), the computer 20 may perform the method steps 101-109 for each slave dongle 12 in turn. That is, steps 301 to 309 are performed for a first slave dongle 12a, and once complete, steps 301-309 are performed for a second slave dongle 12b etc.

Once a plurality of slave dongles 12a-n have the master keying material stored thereon, the slave dongles 12a-n may be distributed to a number of users, e.g. employees or member of a working group to allow them to securely exchange data with one another.

Figure 6:
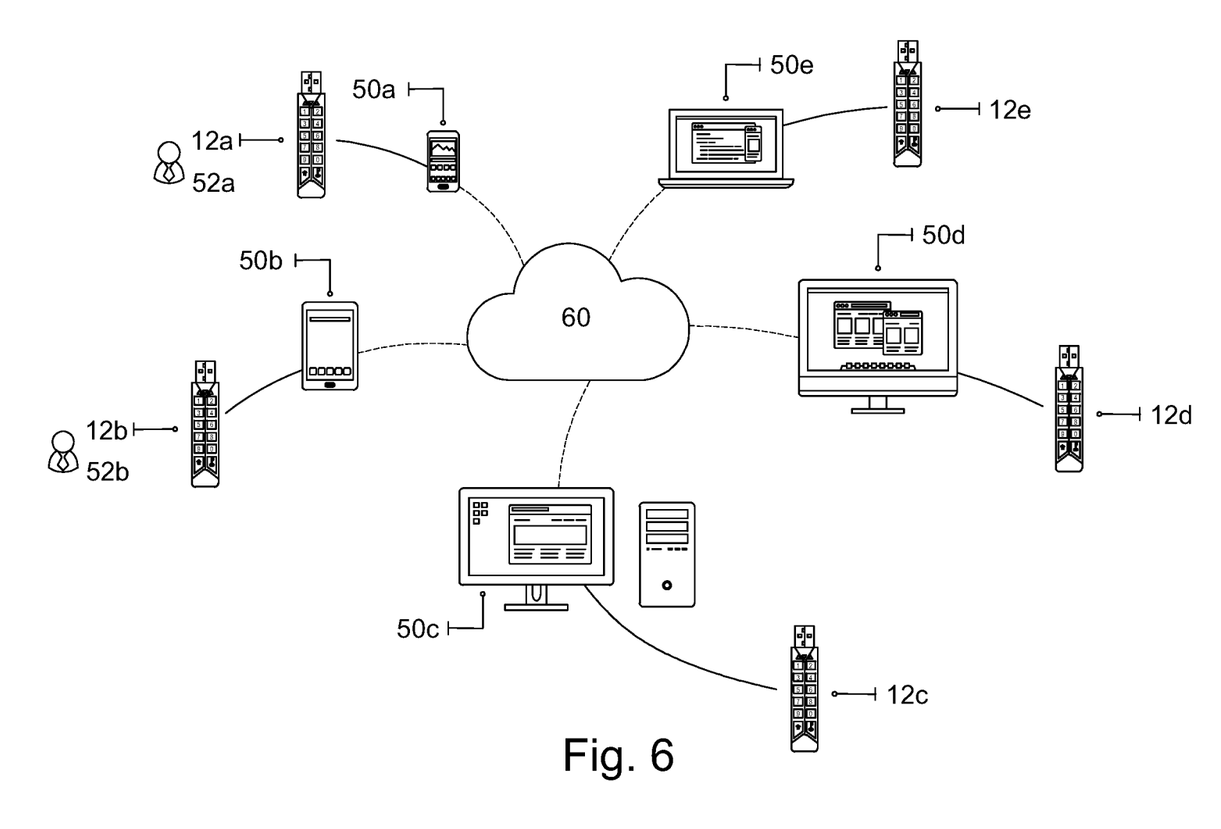
FIG. 6 shows a system of multiple devices, each device having a slave dongle, wherein users can communicate securely with one another over a network using common master keying material.

FIG. 6 shows a schematic diagram in which multiple users may communicate with one another via a network 60 (e.g. via the cloud), using multiple different devices 50a-e. The devices 50a-e may be any of a desktop computer, a tablet computer, a smartphone, a laptop computer and/or any other commonly used computing device capable of connecting to a slave dongle 12.

A respective slave dongle 12a-e is plugged into each device 50a-e. Each slave dongle 12a-e has been prepared with the same master keying material by the method shown above. When a first user 52a wants to share data with another user 52b, the first user 52a instructs his device 50a to send the data to the other user 52b via the network 60. The slave dongle 12a of the first user 52a encrypts the data using the master keying material. The data is then sent via the network 60 to the second user 52b. The second user's device 50b receives the encrypted data and passes it to the second slave dongle 12b. The second slave dongle 12b then decrypts the data using the master keying material and returns the unencrypted data to the second user's device 50b.

In this arrangement, the master keying material is never read by or transferred onto the devices 50a-e, nor is it seen by the network 60. Instead, the master keying material is only ever present on a secure processor in each of the slave dongles 12a-e. Thus, if the network 60 security is compromised, an eavesdropper/hacker will only ever see encrypted data.

Further, if the security of one or more of the devices 50a-e is compromised, the eavesdropper/hacker will only ever see the encrypted and unencrypted data on that device but will not thereby gain access to the master keying material and thus will not be able to compromise the whole network.

Consequently, the compromised device may be repaired/re-secured (e.g. by running an anti-virus program or similar) without requiring that new master keying material is prepared and delivered to each user on a new slave dongle 12.

In an alternative embodiment, not pictured, one of the master dongle 10 or a slave dongle 12 may be configured to perform the method when the two dongles 10, 12 are connected together via e.g. a cable or hub. In this case, the cable is the data transfer system. In this embodiment, all steps requiring a processor are carried out by the master dongle 10 or the slave dongle 12 as appropriate. The method nonetheless works to securely transfer master keying material between master dongle and a slave dongle, as the method does not require processing to be done by the data transfer system. This ensures that an eavesdropper reading signals on the cable never sees the unencrypted master keying material.

The invention claimed is:

1. A dongle for ciphering, receiving and transmitting data to and from an external device, the dongle comprising:
a memory having stored thereon an encryption key for ciphering user data, wherein the encryption key is stored in encrypted form;
a keypad configured to receive authentication data comprising a PIN to confirm an identity of a user, wherein the dongle is disabled for ciphering data unless an authorised user is identified, wherein the encryption key is decrypted and accessible only once the user identity is confirmed;
a data transfer channel configured to couple the dongle to the external device to receive and transmit user data between the dongle and the external device; and
a hardware encryption engine configured to perform a ciphering transformation on user data received from the external device;
wherein the dongle is configured to perform a return transmission to return the user data that has been transformed to the external device via the data transfer channel in real-time using a single data transfer channel without storage of the user data on the dongle.

2. The dongle of claim 1, wherein the hardware encryption engine uses an encryption key stored securely on the dongle to perform the ciphering transformation, wherein the encryption key is accessible only to an authorised user as identified by the user interface.

3. The dongle of claim 1, wherein the data transfer channel is configured for continuously receiving data from the external device and sending data to the external device, wherein the hardware encryption engine performs the ciphering transformation upon receipt of a data packet from the external device, and wherein the return transmission of a transformed data packet to the external device upon completion of the ciphering transformation.

4. The dongle of claim 1, wherein the dongle is configured to operate the data transfer channel in sequential steps for transmission of data from the external device to the dongle, and for return of transformed data from the dongle to the external device.

5. The dongle of claim 1, wherein the dongle is configured such that there is simultaneous transport of data in both directions via the data transfer channel, wherein the encryption engine is arranged to continuously transform the data whilst the data transfer channel is continuously transporting both incoming data and outgoing transformed data to and from the hardware encryption engine.

6. The dongle of claim 1, wherein the data transfer channel is capable of high speed data transfer rates equivalent to that available via USB 3.0.

7. The dongle of claim 1, wherein the data transfer channel is capable of data transfer at rates of up to at least 5 Gbit/s (625 MB/s).

8. The dongle of claim 1, wherein the data transfer channel includes a USB 3.0 interface, or a successor USB standard.

9. The dongle of claim 1, wherein the dongle is not capable of off-line storage of user data transferred to the dongle from the external device.

10. The dongle of claim 1, wherein the user interface is arranged for interaction with a user to receive authentication data for confirming the identity of the user via an input device enabling the identity of the user to be confirmed via a code or biometric input.

11. The dongle of claim 1, wherein the dongle is arranged to provide real-time ciphering of any type of data, including voice call encryption, e-mail encryption or encryption in relation to software as a service.

12. The dongle of claim 1, wherein multi-factor authentication is required to enable the use of the dongle for ciphering data, with the multifactor authentication including confirmation of the user's identity via the user interface and confirmation of the dongle's identity via dongle authentication data stored on the dongle.

13. The dongle of claim 1, wherein a unique key is stored on the dongle that allows the dongle to function as a factor of authorisation.

14. The dongle of claim 1, wherein the dongle contains public/private key pair for creating a digital signature for messages/documents to verify the creator and its data integrity.

15. The dongle of claim 14, wherein the public/private key pair is for creating a hash-based message authentication code for messages/documents to verify the creator and its data integrity.

16. The dongle of claim 1, wherein the dongle further contains a certificate for verifying the validity of the dongle.

17. A system for securely communicating data between users, each user is located at a respective external device, the system comprising:
- more than one dongles, wherein each dongle shares a common encryption key,
- wherein each dongle is a dongle according to claim 1 and is configured to cipher, receive and transmit data to and from the respective external device.

18. The system of claim 17 further comprising:
- a first computing device coupled to a first dongle of the more than one dongles,
- a second computing device coupled to a second dongle of the more than one dongles,
- wherein the first computing device is configured to send a first data to the first dongle, wherein the first dongle is configured to encrypt the first data using the encryption key, and the first device is configured to send the encrypted first data to the second computing device, and
- wherein the second computing device is configured to receive the first encrypted data and send the first encrypted data to the second dongle, wherein the second dongle is configured to decrypt the first encrypted data using the encryption key and to send the decrypted first data to the second computer device.

19. A method of ciphering data using a dongle, wherein the dongle comprises a single data channel and comprises an encryption key for ciphering user data, the method comprising:
- receiving authentication data comprising a PIN for confirming an identity of a user via a keypad;
- verifying the authentication data against stored data for authorised users;
- permitting access to the ciphering function of the dongle upon verification of the authentication data, wherein the encryption key is stored in encrypted form and wherein the step of permitting access includes decrypting the encryption key only once the user identity is confirmed;
- transmitting data from an external device to the dongle via a data transfer interface over the single data channel;
- performing a real-time ciphering transformation at the dongle using a hardware encryption engine; and
- returning the transformed data from the dongle to the external device via the data transfer interface over the single data channel.

20. A non-transitory machine-readable medium having stored thereon instructions for performing a method comprising machine executable code that when executed by at least one machine, causes the machine to:
- receive authentication data comprising a PIN for confirming an identity of a user via a user interface;
- verify the authentication data against stored data for authorised users;
- permit access to the ciphering function of a dongle upon verification of the authentication data, wherein the ciphering function uses an encryption key that is stored in encrypted form and wherein the step of permitting access includes decrypting the encryption key only once the user identity is confirmed;
- transmit data from an external device to the dongle via a data transfer interface over a single data channel;
- perform a real-time ciphering transformation at the dongle using a hardware encryption engine; and
- return the transformed data from the dongle to the external device via the data transfer interface over the single data channel.

21. A method of sharing data securely between authorised computing devices, the method comprising:
- receiving, at a first dongle, first data over a first single data channel;
- encrypting the first data in real-time with master keying material stored in the first dongle, to create encrypted first data, wherein a first computing device is connected to the first dongle;
- returning the encrypted first data to the first computing device over the single data channel;
- transferring the encrypted first data to a second computing device, wherein the second computing device is connected to a second dongle, the second computing device sending the encrypted first data to the second dongle via a second single data channel;
- decrypting the encrypted first data in real-time using the second dongle; and
- transferring first data that is unencrypted from the second dongle to the second computing device via the second single data channel,
- wherein the first dongle is a dongle according to claim 1 and the second dongle is a dongle according to claim 1;
- wherein the first and second dongles include common encryption keying material.

* * * * *